(12) United States Patent
Jennings

(10) Patent No.: US 11,475,519 B2
(45) Date of Patent: Oct. 18, 2022

(54) SYSTEMS AND METHODS FOR DETERMINING A SIGNIFICANCE INDEX

(71) Applicant: TD Ameritrade IP Company, Inc., Omaha, NE (US)

(72) Inventor: Chris Jennings, Omaha, NE (US)

(73) Assignee: TD AMERITRADE IP COMPANY, INC., Omaha, NE (US)

( * ) Notice: Subject to any disclaimer, the term of this patent is extended or adjusted under 35 U.S.C. 154(b) by 129 days.

(21) Appl. No.: 16/736,756

(22) Filed: Jan. 7, 2020

(65) Prior Publication Data
US 2020/0234366 A1   Jul. 23, 2020

Related U.S. Application Data

(63) Continuation of application No. 14/723,165, filed on May 27, 2015, now abandoned, which is a continuation-in-part of application No. PCT/US2013/056033, filed on Aug. 21, 2013, which is a continuation of application No. 13/687,927, filed on Nov. 28, 2012, now Pat. No. 8,478,676.

(51) Int. Cl.
G06Q 30/00   (2012.01)
G06Q 40/04   (2012.01)
G06F 16/22   (2019.01)
G06Q 40/06   (2012.01)

(52) U.S. Cl.
CPC .............. *G06Q 40/04* (2013.01); *G06F 16/22* (2019.01); *G06Q 40/06* (2013.01)

(58) Field of Classification Search
CPC ................................................ G06Q 40/04

USPC .......... 705/37, 1.1, 36 R, 38, 14, 26, 80, 35; 370/242; 463/16
See application file for complete search history.

(56) References Cited

U.S. PATENT DOCUMENTS

| | | | |
|---|---|---|---|
| 7,225,153 B2 * | 5/2007 | Lange | G06Q 40/06 705/37 |
| 8,156,027 B1 | 4/2012 | Haddad et al. | |
| 8,166,032 B2 | 4/2012 | Sommer et al. | |
| 8,630,940 B1 * | 1/2014 | Walters | G06Q 40/00 705/37 |

(Continued)

FOREIGN PATENT DOCUMENTS

| | | |
|---|---|---|
| WO | WO-2009/152154 A1 | 12/2009 |
| WO | WO-2011/016209 A1 | 2/2011 |

OTHER PUBLICATIONS

ProQuestNPLSearch History.*

(Continued)

*Primary Examiner* — John H. Holly
(74) *Attorney, Agent, or Firm* — Harness, Dickey & Pierce, P.L.C.

(57) ABSTRACT

Systems, methods, and computer-readable instructions are configured to calculate an aggregated significance score for consumer goods or website interactions by aggregating historical significance scores and calculating a reference significance score for a benchmark. A relative significance score is derived for each of the consumer goods or website interactions based upon the significance score for each of the consumer goods or website interactions and the relative significance score. A consumer priority index is derived indexed to a relevant measure based on the aggregated significance scores and the reference significance score.

25 Claims, 10 Drawing Sheets

(56) References Cited

U.S. PATENT DOCUMENTS

| | | | |
|---|---|---|---|
| 2004/0230519 A1 | 11/2004 | Parker | |
| 2005/0027629 A1* | 2/2005 | De Breed | G06Q 40/04 705/36 R |
| 2005/0091147 A1* | 4/2005 | Ingargiola | G06Q 40/06 705/37 |
| 2005/0240456 A1 | 10/2005 | Ward et al. | |
| 2006/0242040 A1 | 10/2006 | Rader | |
| 2007/0011073 A1 | 1/2007 | Gardner et al. | |
| 2008/0091585 A1 | 4/2008 | MacQueen et al. | |
| 2009/0186689 A1 | 7/2009 | Hughes et al. | |
| 2009/0240574 A1 | 9/2009 | Carpenter et al. | |
| 2010/0005034 A1 | 1/2010 | Carpenter et al. | |
| 2010/0030799 A1 | 2/2010 | Parker et al. | |
| 2010/0100500 A1* | 4/2010 | Nunes | G06Q 40/04 705/37 |
| 2011/0302106 A1 | 12/2011 | Nosegbe | |
| 2012/0041891 A1 | 2/2012 | Babel et al. | |
| 2012/0143739 A1 | 6/2012 | Lopez de Prado et al. | |
| 2012/0296845 A1 | 11/2012 | Andrews et al. | |
| 2020/0234366 A1* | 7/2020 | Jennings | G06F 16/22 |

OTHER PUBLICATIONS

ProQuestDialogNPLSearch History.*

Office Action for CA Application No. 2,892,524 dated Dec. 17, 2018; 7 pages.

Non-Final Office Action dated Mar. 29, 2019 for corresponding U.S. Appl. No. 14/723,165.

Cui et al., "Comparative Experiments on Sentiment Classification for Online Product Reviews", American Association for Artificial Intelligence, (2006), 6 pages.

State Street Global Markets—Research—Research—Overview, 4 pages (2006), retrieved from: http://www.statestreetglobalmarkets.com/wps/prtal/inernet/ssgm/home/research/.research. . . .

State Street Global Markets—Research—Risk Indices, 1 page (2006), retrieved from: http://www.statestreet.com/research/ssa/index.html.

State Street Investor Confidence Index® Summary, 5 pages, © 2009 State Street Corporation.

"Take a look under the hood", SigFig Features, 3 pages, https://sigfig.com/features.

Baker et al., "Investor Sentiment in the Stock Market", Journal of Economic Perspectives, (2007), pp. 129-151, vol. 21, No. 2.

Carey, Theresa W., "How Daring Are You?" Barron's Electronic Investor, Saturday, Oct. 6, 2012, 2 pages, www.djreprints.com.

International Search Report and Written Opinion for PCT Application No. PCT/US2013/056033, dated Dec. 12, 2013, 10 pages.

U.S. Office Action, on U.S. Appl. No. 13/687,927, dated Feb. 4, 2013, 10 pages.

U.S. Notice of Allowance, on U.S. Appl. No. 13/687,927, dated Apr. 3, 2013, 11 pages.

Track you stocks and funds in real time, free, 10:00 a.m. EST Jan. 16, 2013, Portfolio Tracker, 2 pages, http://www.usatoday.com/story/money/personalfinance/2012/09/29/portfolio-tracker-intro/1597081/.

* cited by examiner

*Your Portfolio Active Investor Confidence Reading = 1.2 -> Bullish*
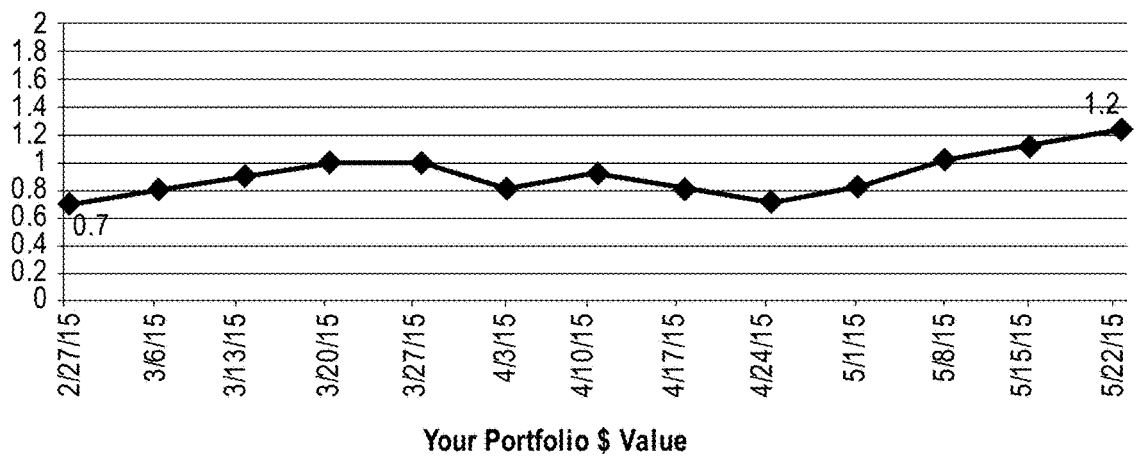
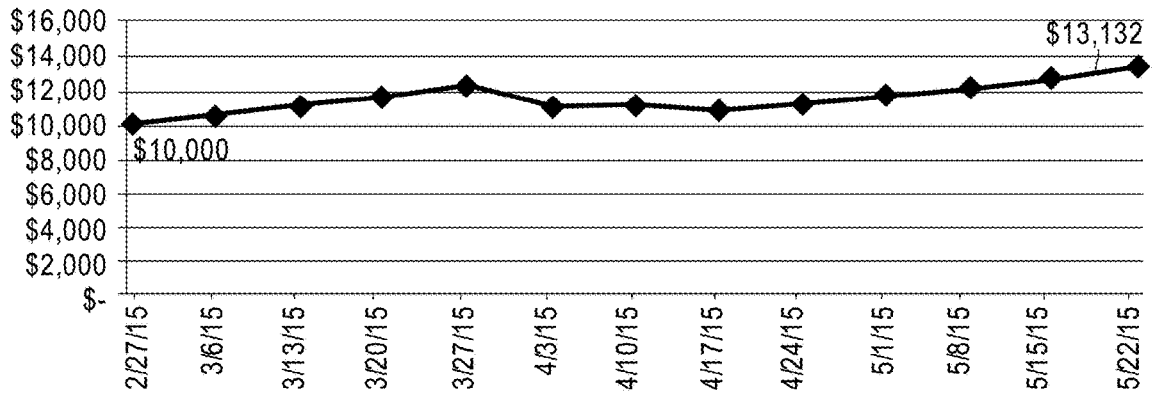
FIG. 10

SYSTEMS AND METHODS FOR DETERMINING A SIGNIFICANCE INDEX

CROSS-REFERENCE TO RELATED APPLICATIONS

This application is a continuation of U.S. patent application Ser. No. 14/723,165 filed May 27, 2015, which is a continuation-in-part of PCT application PCT/US2013/056033 filed Aug. 21, 2013, which claims the benefit of U.S. patent application Ser. No. 13/687,927 filed Nov. 28, 2012 (now U.S. Pat. No. 8,478,676). The entire disclosures of the applications referenced above are incorporated by reference.

BACKGROUND

Consumer confidence and sentiment indices are valuable indicators that business practitioners, policy makers, investors, and traders use to inform their decisions. Currently most indices are generated via surveys, text and data mining, as well as a number of random sampling methods. These indices are too onerous to administer. Most importantly they are inaccurate as people do not always answer survey questions in ways that are consistent with their behavior, and the random samples chosen are not statistically representative due to the heterogeneous fragmentation of the population. For an index to be truly representative of its claims, it should capture granular explicit behavior from a very large number of transactions of a very large homogeneous population under controlled conditions.

SUMMARY

The present disclosure describes an index that explicitly reflects the sentiment and confidence of traders, whereby each of a plurality of transactions is captured, assigned a sentiment score, and can be aggregated using a number of algorithms, and statistical methods. In particular, the present disclosure relates to methods and systems for determining a quantitative sentiment index based upon securities contained within a number of brokerage accounts.

In general, one aspect of the subject matter described in this specification can be embodied in systems for calculating a volatility score for each of a plurality of securities and calculating a reference volatility score for a benchmark. A relative volatility score is derived for each of the plurality of securities based upon the volatility score for each of the plurality of securities and the reference volatility score. An aggregated volatility score is derived for each of a plurality of accounts based in part on securities held within an account and the relative volatility scores for the securities. A sentiment index is determined based upon the aggregated volatility score for each of the plurality of accounts. Other implementations of this aspect include corresponding systems, apparatuses, and computer-readable media configured to perform the actions of the method.

In one embodiment, a system is described to calculate a significance index comprising one or more electronic processors, operably connected to a memory. The one or more electronic processors are configured to receive financial instrument transaction information regarding exchange of a first financial instrument for a second financial instrument, derive a significance score for the second financial instrument, and generate a significance index based upon the significance score for the second financial instrument and a plurality of additional significance scores.

In another embodiment, a method is described for managing a user experience based upon a consumer index. The method may comprise receiving financial instrument transaction information associated with each of a plurality of accounts regarding exchange of a first financial instrument for a second financial instrument. The method may also include determining a significance score associated with the financial instrument transaction for each account of the plurality of accounts, calculating a significance index for the second financial instrument by aggregating the significance score for each of the plurality of accounts, determining a consumer priority index indexed to a relevant measure based on the aggregated significance score for each of the plurality of accounts, and modifying a sales interface associated with the second financial instrument based upon the consumer priority index.

In another embodiment a system is described comprising one or more electronic processors, operably connected to a memory. The one or more electronic processors are configured to receive security transaction information associated with each of a plurality of accounts regarding exchange of a financial instrument for a security, determine a significance score associated with the security transaction for each account of the plurality of accounts, and calculate a significance index for the security by aggregating the significance score for each of the plurality of accounts.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 10 is a graph over a period of time of a quantitative retail sentiment index of a sample investor portfolio compared to the portfolio value in accordance with an illustrative embodiment.

Figure 1:
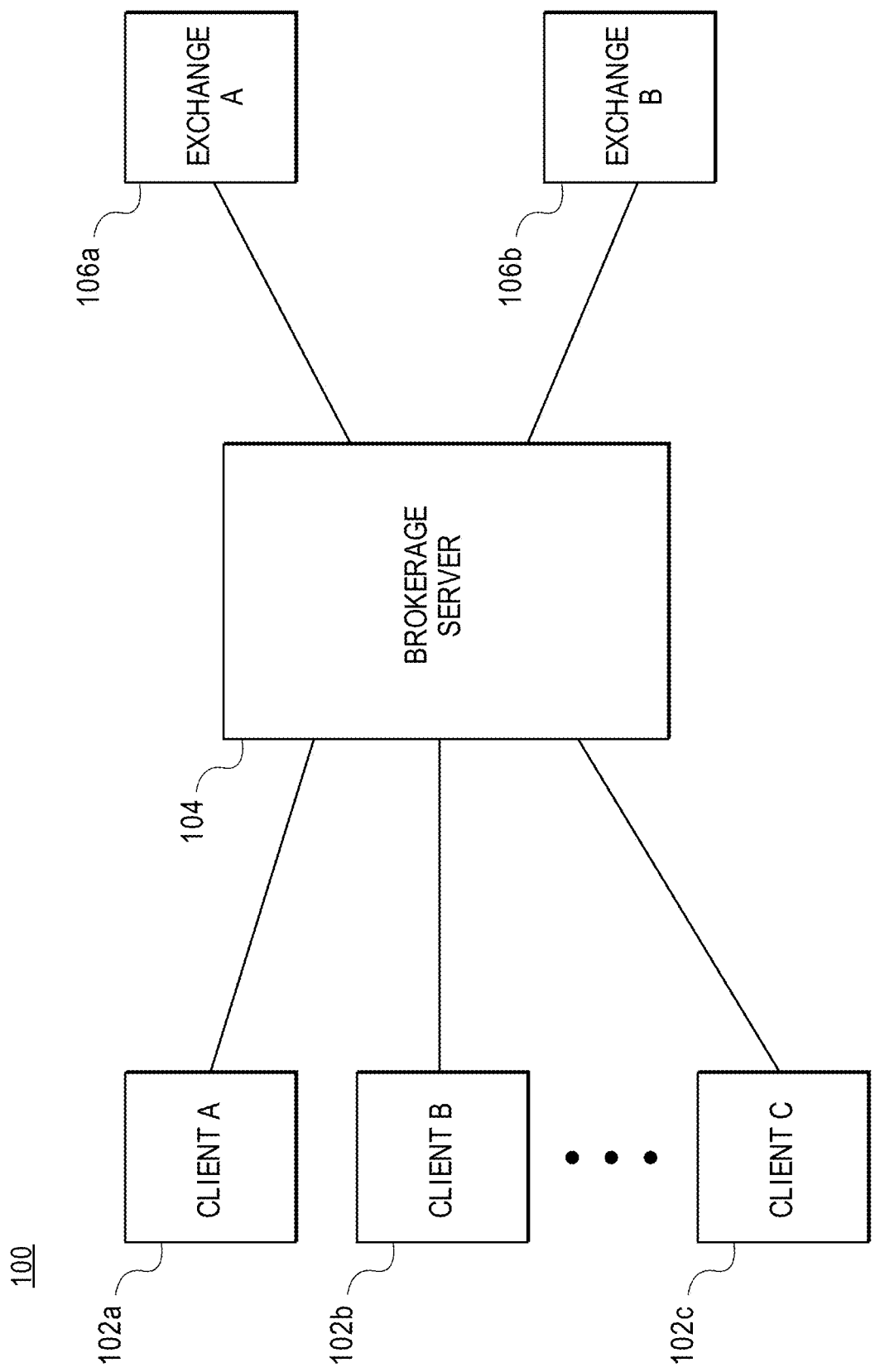
FIG. 1 is a block diagram of a system for providing a user with a brokerage firm's online services over the Internet.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

In reference to FIG. 1, a system for providing online brokerage services to users over the Internet is shown. Local machines 102a-c may access a server 104 hosting the online services provided by a brokerage firm. A local machine can be a desktop computer, a laptop, a tablet computer, a smart phone, or any other computing device. The server 104 may be a number of servers or a server farm. The brokerage firm's services may utilize real-time trading data to provide a user with the most up to date and current trade information. The server 104 can also allow users of local machines 102a-c to create accounts and trade various securities via various exchanges 106a-b.

As users trade securities via the server 104, the server 104 can keep detailed records describing the various trades and holdings of users. These records can be used to provide the user with information regarding their previous trades and their current holdings. For example, a user can access a history of all previous trades, which can provide the type of trade, the date of the trade, a security identifier, a unit price, a number of units purchased, and a total trade amount. Other information can also be kept as part of the record keeping process, for example, but not limited to, a user identifier, a time the trade was initiated, a time the trade was executed, etc. In addition, the server 104 can also analyze the trades across one or more users or accounts.

In one implementation, a sentiment index can be calculated from actual trades of a large number of clients, making the sentiment index a quantitative index. The sentiment index can be used to determine the "sentiment" of clients, portfolios or accounts. The sentiment may be generally described as an overall attitude about equity markets based on holdings and arrangement of holdings of a client, portfolio, or account. In one embodiment, the sentiment is reflected in the action and/or inaction taken with respect to an asset, typically a security. In one implementation, the sentiment is reflected in the risk taken by the account. The risk may be relative to a benchmark security or index, such as, but not limited to, the S&P 500®. The sentiment may reflect a historical covariance between the security and the benchmark, such as correlated volatility. For example, beta ($\beta$) may be used as an expression of sentiment by comparing the correlated volatility of a security to the benchmark.

In various implementations, the sentiment index can be calculated at a client level, a portfolio level, or an account level. The portfolio and account may belong to a single client and reflect the sentiment of a single person. Alternatively, a portfolio or account may belong to multiple individuals and reflect the sentiment of multiple people. A portfolio or account may belong to a business entity or financial advisor and reflect the sentiment of the manager of that portfolio or account in their business capacity. Each portfolio or account may be associated with one or more brokerage service entities. Accordingly, in the examples described below, clients or portfolios should be understood as being applicable in place of accounts unless otherwise noted. In some implementations, the clients, portfolios, or accounts that are used in calculating the sentiment index can be homogenous. For example, the clients can all be classified as investors, individual traders, shoppers, etc.

In some implementations, the sentiment index can be thought of as describing an account as either a risk-on account or a risk-off account. Non-limiting examples of risk-on positions include long equity positions and long leveraged equity exchange-traded funds (ETFs). Non-limiting examples of risk-off positions include long inverse equity ETFs, bonds, bond funds, and cash balances. Some or all of the positions within an account can be aggregated to determine if the account is a risk-on account or a risk-off account, and how much risk the account is exposed to compared to the benchmark.

In addition, the number of clients, portfolios or accounts used in calculating the sentiment index can vary depending on the type of index being calculated. For example, sentiment indices can be calculated using accounts based upon segmentation or account types, including whether the account is a financial advisor account, an individual account, a custodian account, etc. Because each account is scored, possible segmentations include vintage, trade segments, generation, business units, asset size, etc. In one embodiment, the sentiment index is calculated using a large number of accounts. The number of accounts used is large enough that individual accounts cannot be identified from the calculated index. In one implementation, each account has the same weight in calculating the index, regardless of the monetary amount of the account. In such an embodiment, the sentiment index reflects the sentiment of the aggregate account holders rather than the aggregate money, thus the sentiment of accounts with less value is not masked by the sentiment of accounts with large monetary value. In other implementations, accounts are weighted based upon a factor such as the monetary value of the account, number of trades, volume of trades, etc.

Figure 2:
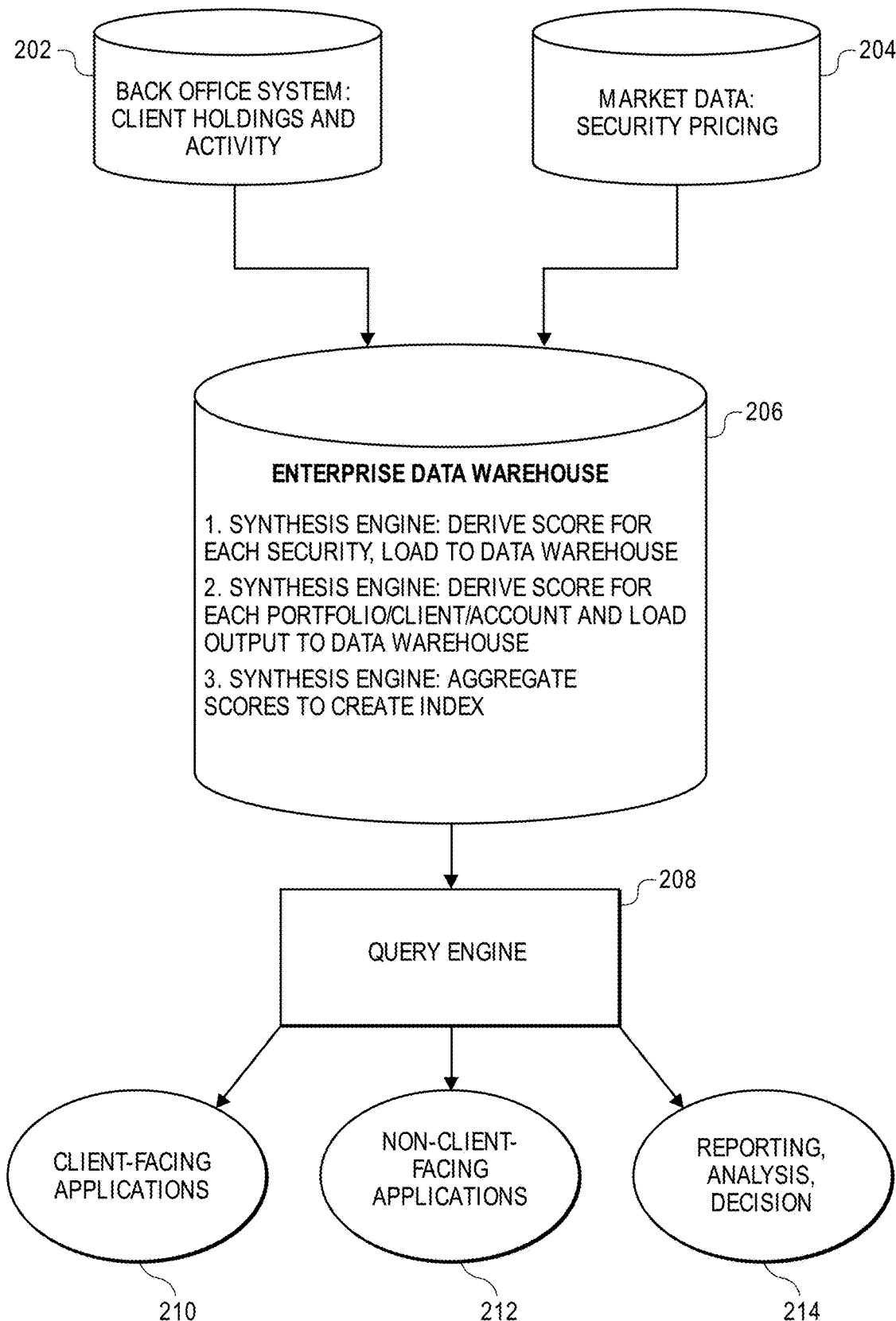
FIG. 2 is a block diagram of a system for calculating and providing a quantitative retail sentiment index based on client behavior in accordance with an illustrative embodiment.

FIG. 2 is a block diagram of an implementation of a system for calculating and providing a quantitative retail sentiment index based on account behavior in accordance with an illustrative embodiment. A back office data store 202 contains trading records of accounts associated with one or more brokerage services. As described above, these trading records contain information about individual security trades from a large number of accounts. The back office data store 202 can also include information about the accounts themselves, e.g., aggregated data from the trading records, client demographic data, etc. A market data store 204 contains historical prices of various securities that can be traded. An enterprise data store 206 can be used to store various data for use in calculating one or more sentiment indices as well as storing the indices themselves. Two or more of the various data stores 202, 204, and 206 can be located on a single server. The enterprise data store 206 can store a volatility score for each security. As described in greater detail below, these volatility scores can be used to calculate a volatility score for each account, portfolio, client, etc. These volatility scores can also be stored on the enterprise data store 206.

The volatility scores for the accounts, portfolios, and/or clients, can then be aggregated to create various sentiment indices, which can be stored on the enterprise data store 206. In other implementations, the sentiment indices can be stored in other various data stores that are separate from the enterprise data store 206.

A query engine 208 can be used to access the stored sentiment indices located in the enterprise data store 206 or other data store. The query engine 208 provides an interface for various applications to access and incorporate one or more of the sentiment indices stored in the enterprise data store 206. For example, client facing applications 210, such as a market overview page, can incorporate a sentiment index. In another example, the query engine 208 can be used to access an account's index score for display to the client who owns the account. Non-client facing applications 212 can also access the various sentiment indices. As a non-limiting example, an advertising or marketing selection process can use the scores associated with accounts to determine which accounts to send marketing materials to as well as to tailor the marketing material or advertisement to the account. Other applications, such as reporting, analysis, and decision support 214, can also access and utilize the data from the enterprise data store 206.

Figure 3:
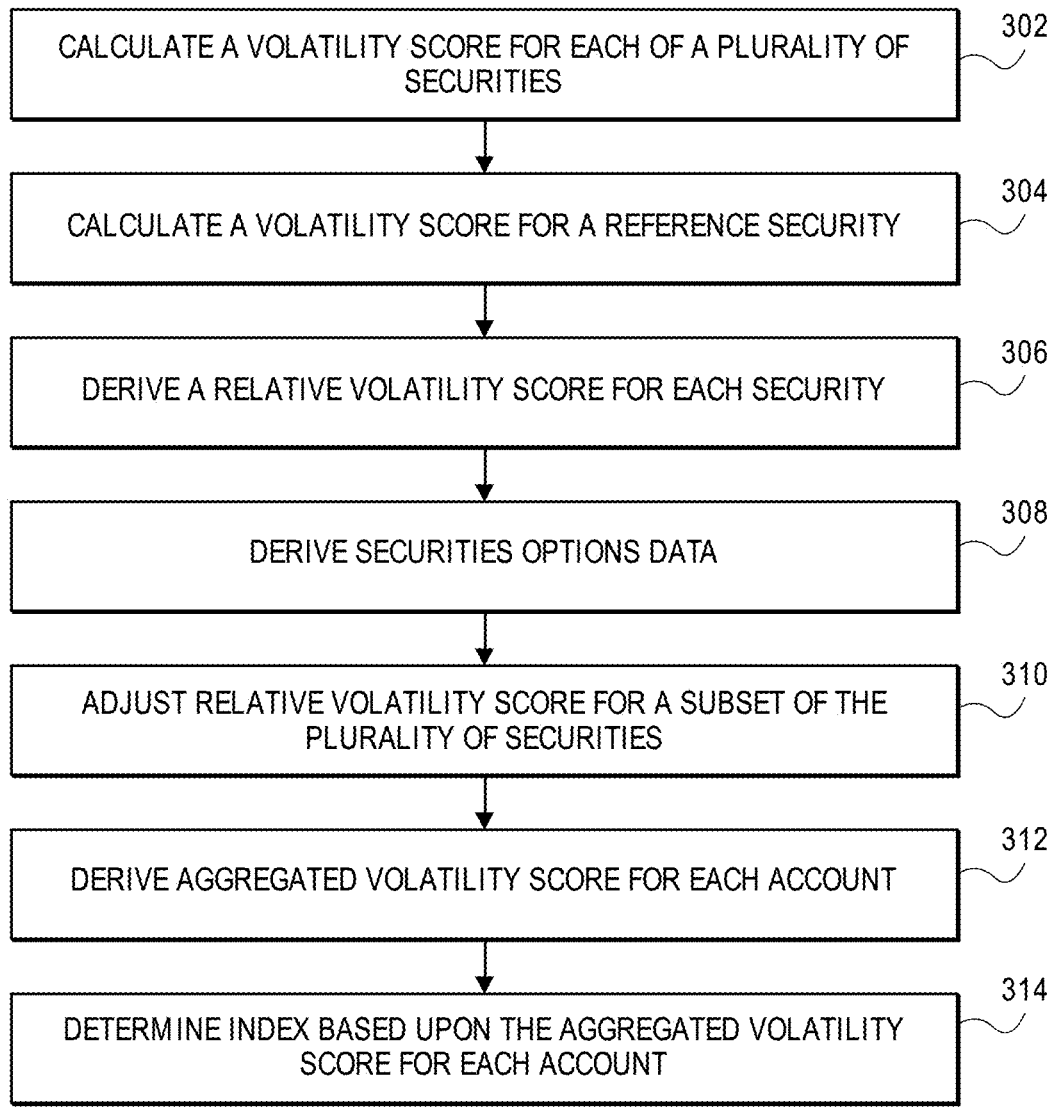
FIG. 3 is a flow diagram of a method for determining a quantitative retail sentiment index based on client behavior in accordance with an illustrative embodiment.

As mentioned above, the back office data store 202 and the market data store 204 contain data that can be used to calculate various sentiment indices. FIG. 3 is a flow diagram of a method 300 for determining a quantitative retail sentiment index based on account behavior in accordance with an illustrative embodiment. Additional, fewer, or different operations of the method 300 may be performed, depending on the particular embodiment. The method 300 can be implemented on a computing device. In one implementation, the method 300 is encoded on a computer-readable medium that contains instructions that, when executed by a computing device, cause the computing device to perform operations of the method 300.

In one implementation, before calculating a sentiment index, some initial data is needed. The risk associated with each security must be known. For example, sufficient historical prices for each security included in the sentiment index and the benchmark to provide a statistically significant correlated volatility determination are needed. In one embodiment, the benchmark used to derive a relative volatility can be selected from the historical prices of the securities. A volatility for each of the securities can then be calculated using the historical prices (302). In one implementation, the volatility is calculated using a rolling exponential average volatility over a time period. In another implementation, a rolling average is subtracted from the calculated volatility. This removes the security appreciation/depreciation trend from the security's volatility. How the volatility score is calculated can depend upon the type of security. For example, in one implementation, as described in greater detail below, the volatility score of a stock is calculated differently than the assigned volatility score of an option. Other securities can have their volatility score calculated in the same way. For example, in one implementation, volatility scores for stocks and warrants can be calculated in the same manner. Using an exponential average volatility weights current events higher than older events. This helps to prevent scores from changing significantly when older events are no longer part of the time period. As a non-limiting detailed example, the volatility is calculated as the exponential average change in the value of a security over a year. That is, how much did the security change in value through the year. The average change in the security value can be calculated as, but not limited to, daily change, weekly change, quarterly change, etc. Other volatility values can also be used. For example, beta, correlated beta, total beta, etc., can be used. In addition, a volatility value can be used without weighting, with weighting, or exponentially weighted.

For newly listed securities, the volatility score can be set to an initial amount for a period of time. For example, for the first four weeks that a security is listed, the security's volatility score can be set to 1, regardless of the price history of the security. After the period of time has expired, the volatility value can be calculated as described above. For some newly listed securities, such as, ETFs, an initial value is not required as the volatility score can be calculated for the ETF using the historical prices of the securities that make up the ETF.

The volatility for a benchmark is also calculated (304). The volatility for the benchmark is calculated in the same manner as other securities. The benchmark can be an index such as the S&P 500® or other indices that track stock markets. The benchmark is used to calculate a relative volatility score for the other securities (306). In one implementation, the relative volatility for a security is calculated as the volatility score of the security divided by the volatility score of the benchmark.

In some implementations, a sentiment index is based upon scores that take into account liquidation values of portfolios with the value of the account's positions. In these implementations, options data can be derived (308). For example, this data can include delta values, the security identifier, underlying price, underlying relative adjusted volatility score, and an option multiplier. Delta values for options are based upon the option price movement relative to the underlying security. As described in greater detail below, the delta values and the underlying security values can be used in calculating the volatility score for an account, portfolio, or client.

When the chosen benchmark is a stock market index, such as the S&P 500®, securities with a high positive volatility score are considered bullish securities. That is, the more volatile the security, the more bullish the security. Some securities will have a calculated volatility score that is positive, but should be negative based upon the chosen benchmark. These securities are those that are assumed to be held because the security moves opposite of the chosen benchmark. For example, some securities are negatively correlated to the benchmark, such as, but not limited to, some ETFs. Securities can have their volatility score adjusted in various ways (310). For example, a volatility score can be scaled based upon how often the security moves in the same direction as the benchmark. As another example, the volatility score can be reversed to be a negative value. In one implementation, these securities can be identified by determining a security's coherence with the benchmark. Securities can have their relative volatility scores changed to a negative value based upon a negative correlation threshold of 25% to 60% with the benchmark. In another implementation, the relative volatility score can be changed based on the strategy or structure of the security. For example, inverse ETFs, long term bonds, etc., can have their relative volatility score reversed.

Options can also have an assigned relative volatility score based upon the underlying security of the options. In one implementation the assigned relative volatility score can be changed to a negative value based upon the option's delta values and the underlying security. This can occur in a similar manner to warrants, bonds, ETFs, etc., as described above. In addition, the relative volatility score can have an initial negative value based on the type of option, e.g., a put of a security. An initial negative value, however, can be changed to a positive value based upon the negative correlation threshold as described above.

In one implementation, holding stocks, unlike bonds, ETFs, etc., is always considered bullish, regardless of the correlation with the benchmark, and therefore, will have a positive relative volatility score. This is true even when a stock is purchased that has gone down when the benchmark has gone up. Conversely, shorting stocks will be considered bearish and have a negative relative volatility score.

In another implementation, the volatility score for a security can be calculated using a trust factor. The trust factor is a value that indicates how a security moves in relation to a benchmark on a given day. For example, the trust factor for a security is how likely the security moves in the same direction as the benchmark on a given day. Accordingly, the trust factor attempts to capture securities that were purchased with the intent of hedging or betting against the benchmark. In one implementation, the trust factor is weighted towards a security moving in the direction of the benchmark. This requires a strong negative correlation between a security and the benchmark prior to making the trust factor a negative value. In one implementation, the trust factor for a security over time is a smooth curve, such that the transition from a positive to negative, or vice versa, trust score is smooth.

As an example of calculating a trust factor, the trust factor can be a value between −1 and 1. If a security moves in the same direction as the benchmark some threshold amount, the trust factor can be set to 0.99. The threshold amount can be a value such as, but not limited to, 10%, 20%, 21%, 25%, etc. If the security moves in the opposite direction as the benchmark some threshold, such as, but not limited to, 75%, 79%, 80%, 85%, etc., the trust factor can be −0.99. For securities that fall between the two thresholds, the trust score can be determined on a linear basis or on an exponential basis. For example, a linear equation can be used that weights the trust factor to be positive when the security moves in the same direction as the security some amount, such as, but not limited to, 55%, 60%, 66%, 70%, etc.

The trust factor can be used to modify the relative volatility score of a security. In one implementation, the relative volatility score is multiplied by the trust factor to generate an updated relative volatility score. Because the trust factor takes into account how the security moves compared to the benchmark, the trust factor can be used to change the sign of the relative volatility score. The trust factor does not need to be applied to every security. For example, the trust factor can be applied to all securities with the exception of individual stocks. Not applying the trust factor to stocks assumes that clients are rational and a stock purchase is made with the assumption that the stock price will increase over time, regardless of how the stock has performed in the past.

Figure 8:
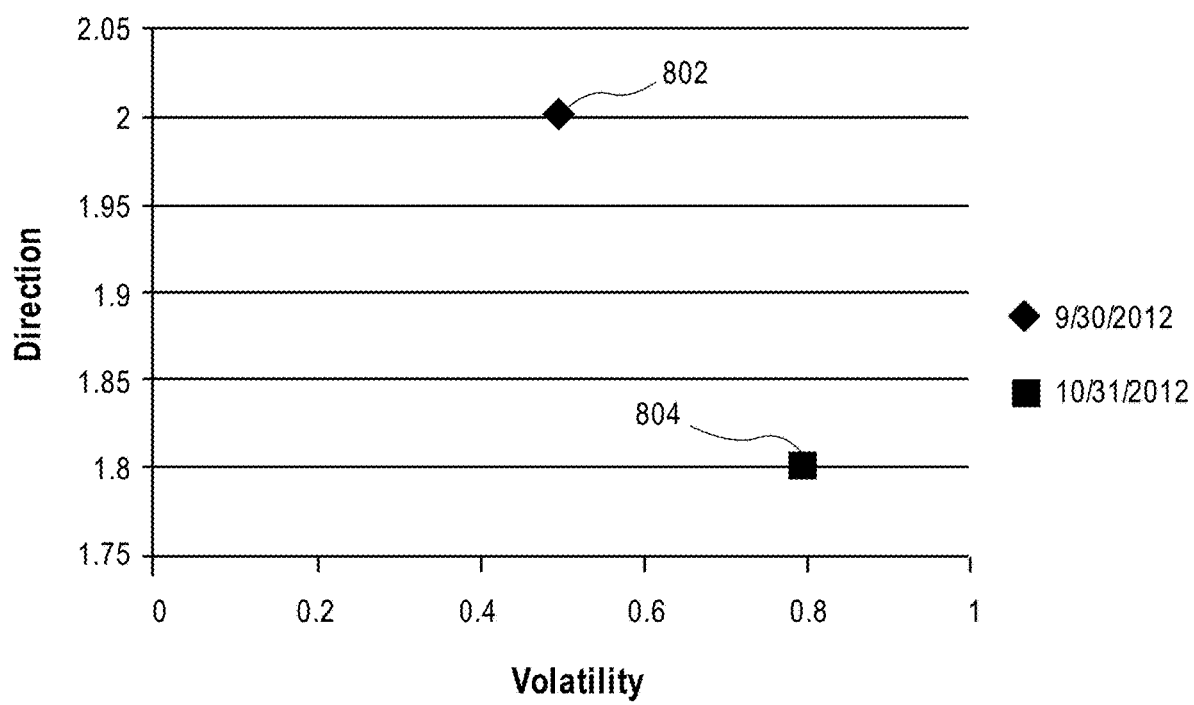
FIG. 8 is a graph of a two axis index in accordance with an illustrative embodiment.

In another implementation, a relative volatility score and/or a quantitative retail sentiment index can be graphed. FIG. 8 is a graph of a two axis index in accordance with an illustrative embodiment. The x-axis shows the volatility which can be based on the relative volatility or the absolute volatility of security. The y-axis maps the direction of the security in comparison with a benchmark. The y-value can be based on probability or correlation of the security with the benchmark. The two data points are plotted on the map and the value becomes the relative volatility score and/or quantitative retail sentiment index. Example index 802 and 804 correspond to the index value for a security on two separate dates, e.g., Sep. 30, 2012 and Oct. 31, 2012 respectively.

In some implementations, newly listed securities or outlier securities can be removed from further analysis or place holder values can be used for these securities. If these securities are filtered from further analysis, the securities will be ignored in any accounts that have positions in these securities. Thus, the filtered securities will not affect the derived sentiment index. Other securities can be filtered, such as, but not limited to, pink sheets, bulletin board securities, non-standard assets, etc.

After the relative volatility score is calculated for each security, an aggregated volatility score for an account is derived (312). In one implementation, the aggregated volatility score is calculated on a weighted basis based upon the value of each security relative to the total account value. In other implementations, an aggregated volatility score can be calculated for each client or each portfolio. An index based upon the aggregated volatility scores for each account can then be determined (314). In one implementation, each account has one vote in the index. That is, each account has the same relative impact on the index as any other account, regardless of the monetary value of the account. In other implementations, the index can be weighted based upon the monetary value of an account, the number of trades, the volume of trades, etc. Regardless of any weighting, the index is calculated based upon actual account behavior such as trades and holdings of securities. Before calculating the index, certain accounts can be filtered. For example, accounts that do not have any positions in any securities can be removed, i.e., accounts that have a zero balance or hold only cash positions. After these accounts are filtered, the index can be calculated based upon the aggregated volatility score of the remaining accounts. In addition, various indices can be created based upon a subset of account data. For example, a total sentiment index can be calculated from all of the account data. As another non-limiting example, sentiment indices based upon demographic data, position in a common security, monetary account value, etc., can be calculated. In another implementation, a sentiment index can be calculated using only securities from a particular market.

In another implementation, the volatility score for a security can change for an account based upon how the client holds the security. For example, holding options in a security or buying securities on margin can change the volatility score compared to holding the security outright. In this implementation, the volatility score for each security held in an account is calculated based upon the security's relative volatility score. In one implementation, the account specific relative volatility score for a position in a security is calculated as: the security quantity×the delta value×quantity multiplier×underlying security price×relative volatility score of security. In one implementation, the delta value can be a proxy of an option expiring in the money. The delta value can also be based the Black-Scholes model or calculated as the percentage movement in the price of an option divided by the percentage movement in the underlying security. The quantity multiplier is the number of shares of the underlying security of the options contract. The security quantity is the number of securities, e.g., option contracts that are held. The account-specific relative volatility score can then be summed across an account to derive a total account-specific relative volatility score. The total account-specific relative volatility score is used to generate a relative volatility score for the account by dividing the total account specific relative volatility score by the liquidation value of the account. The relative volatility score for the accounts can then be used to calculate various sentiment indices as described above.

In one embodiment, a synthetic beta is calculated for an account as the account's volatility score. The synthetic beta is a weighted score that factors in leverage (e.g., margin purchases) and hedging, such as through the use of derivatives (e.g., options). In one implementation, margin purchases are taken into account. The synthetic beta is equal to the security's beta multiplied by the security's value divided by its liquidation value (i.e., net the margin loan). In a further implementation, margin purchases may be accounted for on a client, account, or portfolio basis rather than at the individual security level. For example, the volatility score for the account is calculated and then modified by the account's holdings divided by liquidation value.

As a non-limiting example of the above account-specific relative volatility, a first account has a $10,000 liquidation value holding $10,000 worth of an S&P 500® ETF. In this example, the S&P 500® index is used as the benchmark. The account specific relative volatility score is 1. A second account having a $10,000 liquidation value but holding $20,000 worth of the S&P 500® index would have an account specific relative volatility score of 2. In the second account, a portion of the S&P 500® index position is purchased on margin, which accounts for the difference between the liquidation value and the value of the holdings.

Figure 4:
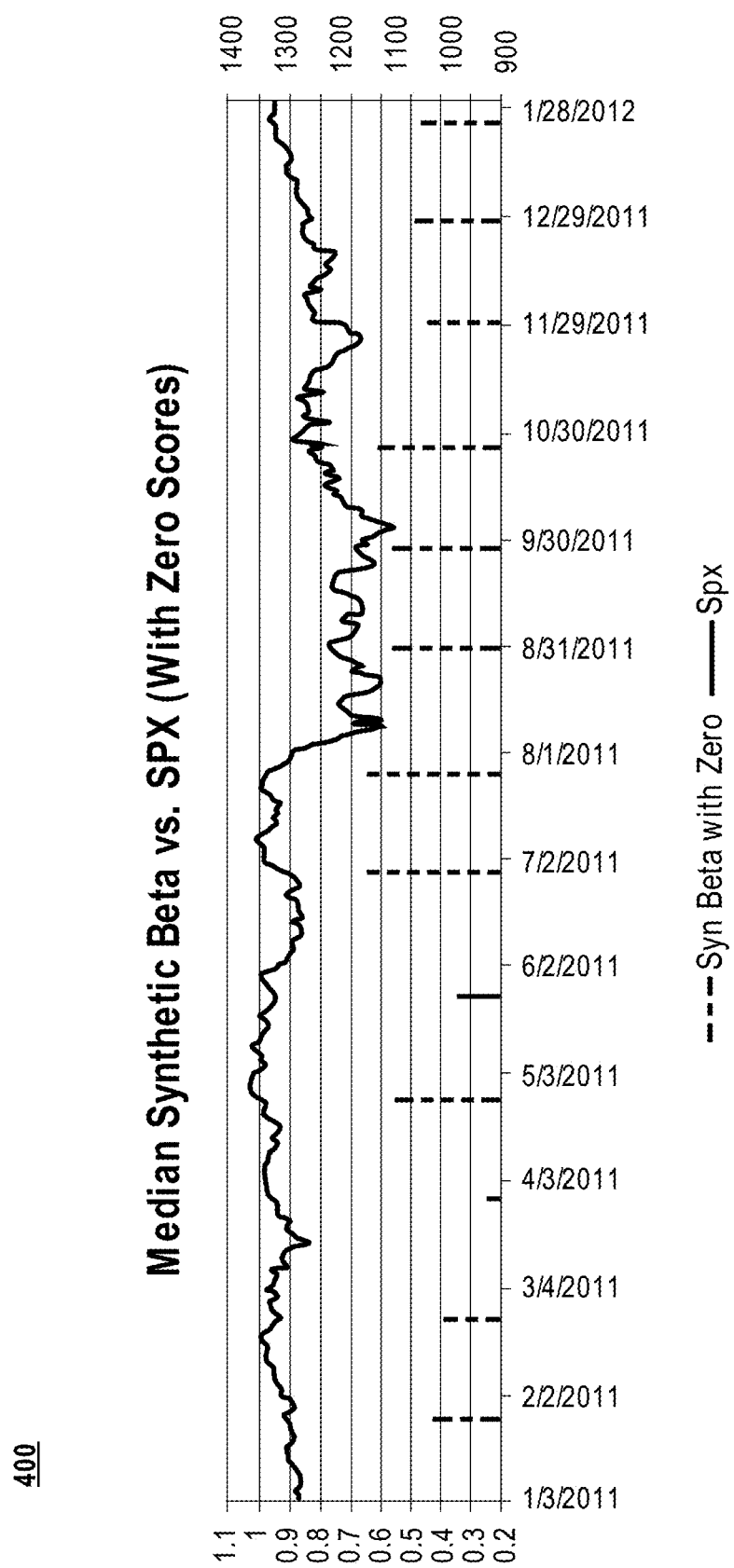
FIG. 4 is a graph over a period of time of a quantitative retail sentiment index and a benchmark in accordance with an illustrative embodiment.
Figure 5:
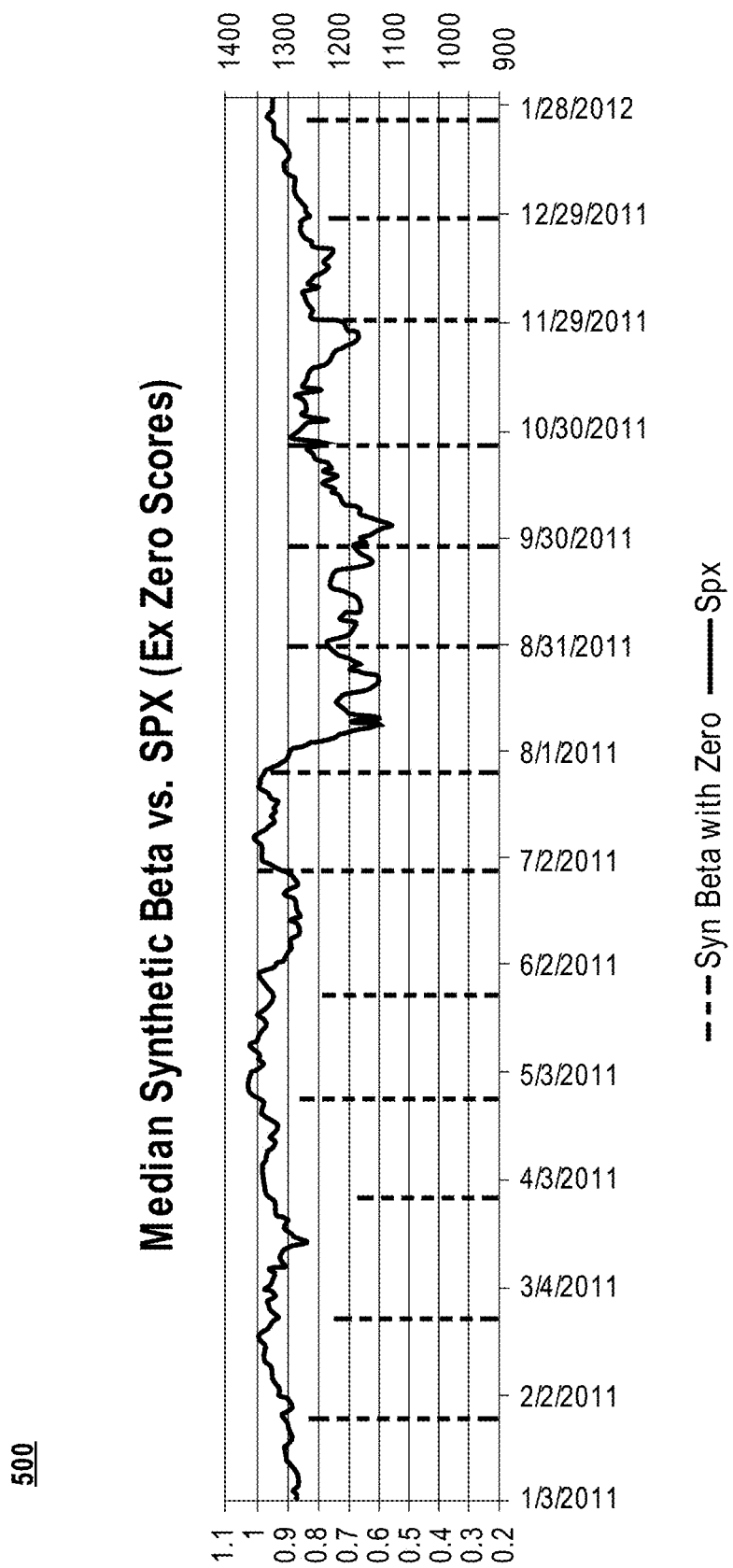
FIG. 5 is a graph over a period of time of a quantitative retail sentiment index and a benchmark in accordance with an illustrative embodiment.

FIGS. 4 and 5 are graphs over a period of time of a quantitative retail sentiment index and a benchmark in accordance with an illustrative embodiment. In these figures, the quantitative retail sentiment index is termed a synthetic beta and is graphed against the S&P 500® index (SPX). In FIG. 4, accounts that are cash only and accounts that hold positions in one or more securities are used to calculate the sentiment index. In contrast, FIG. 5 shows the sentiment index calculated using only accounts that contain at least one position in a security. As shown, the sentiment index on average is higher, since all cash holdings have low volatility and thus a low or zero relative volatility score. The sentiment index is shown on a monthly basis, but could be shown at a different frequency, e.g., weekly, daily, hourly, etc.

Figure 6:
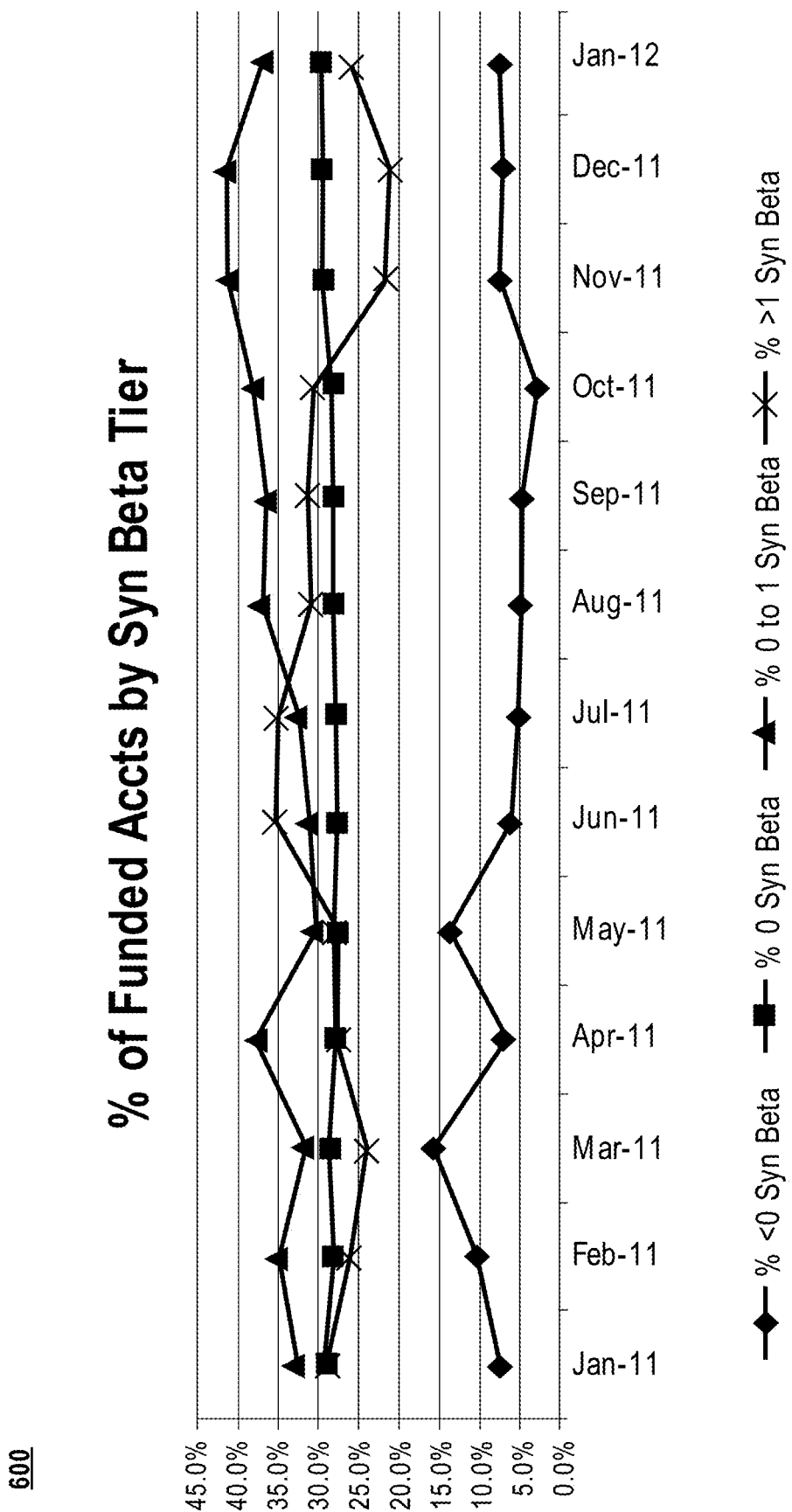
FIG. 6 is a graph over a period of time illustrating the number of accounts within a range of a quantitative retail sentiment index in accordance with an illustrative embodiment.

FIG. 6 is a graph over a period of time illustrating the number of accounts within a range of a quantitative retail sentiment index in accordance with an illustrative embodiment. This graph illustrates the percentage of accounts that have a particular range of aggregated volatility score. As shown in FIG. 6, the percentage of accounts that have a less than 0 aggregated volatility score fluctuates. An aggregated score less than 0 indicates that the account moves in the opposite direction of the benchmark.

Figure 7:
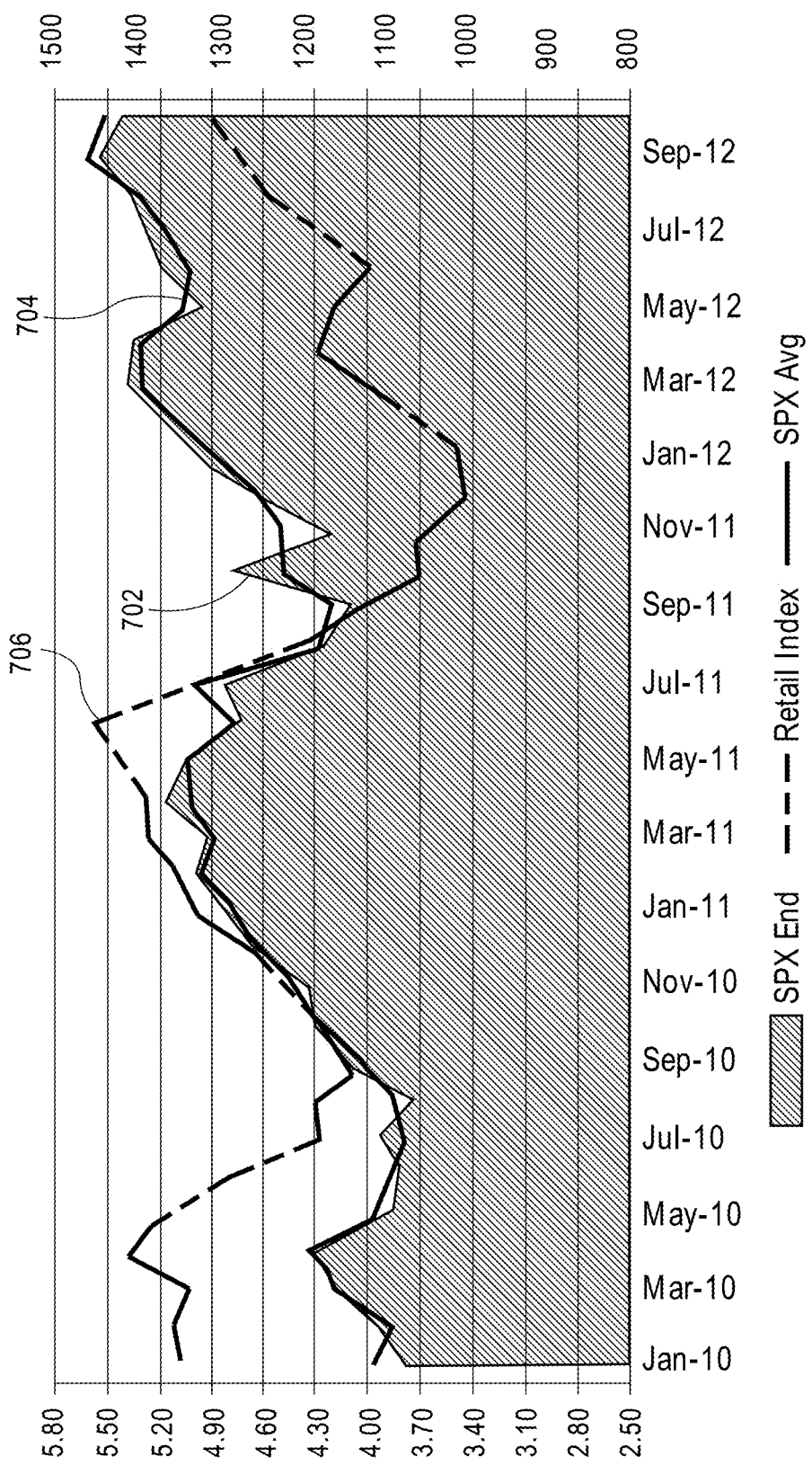
FIG. 7 is a graph over a period of time illustrating a benchmark and a quantitative retail sentiment index in accordance with an illustrative embodiment.

FIG. 7 is a graph 700 over a period of time illustrating a benchmark and a quantitative retail sentiment index in accordance with an illustrative embodiment. A line 704 indicates an average, such as a daily average, of a benchmark, such as S&P 500®. In addition, the graph 700 can include a line 702 indicating the ending value of the benchmark. A line 706 indicates the performance of a quantitative retail sentiment index. FIG. 7 allows for a visual comparison of the benchmark to the quantitative retail sentiment index.

As described above, once the aggregated volatility scores have been calculated for accounts, portfolios, and/or clients, these scores can be used in various ways. As one non-limiting example, the aggregated volatility scores can be used to send targeted marketing materials or advertisements to clients. The aggregated volatility scores can also be used to enhance data provided to a client. For example, the aggregated volatility score can be presented to the client, along with an explanation of the score and its meaning. In addition, particular types of securities can be identified based upon the aggregated volatility scores. For example, the securities that are currently being traded in accounts associated with a range of aggregated volatility scores can be determined. These can then be provided to the client; for example, the securities that are currently being bought by bullish clients or sold by bearish clients. As another example, securities that were bought or sold by accounts whose aggregated volatility score changed more than a predetermined amount over a period of time can be determined and provided to clients.

In addition to the use of the aggregated volatility scores, the relative volatility scores of securities can be used in various ways. As one example, a client can search for securities based upon their relative volatility scores. In one implementation, a client can search for securities that are related to their relative volatility score. For example, a client may want a portfolio to have a target relative volatility score that is different than the portfolio's current relative volatility score. Securities can be searched that if held in a certain manner would move the current volatility score toward the target relative volatility score. The search results can also indicate as to how the security should be held, e.g., long, short, etc., to have the intended change to the portfolio's relative volatility score.

In another implementation, a significance score may be related to a financial instrument transaction. In this context, a financial instrument is a tradable asset of any kind; either cash, evidence of an ownership interest in an entity, or a contractual right to receive or deliver cash or another financial instrument, asset, such as a consumer good, or service. The financial instrument transaction may include the exchange of one financial instrument, such as cash or the like for a second financial instrument, for example assets such as individual stocks, stock indexes, custom lists of stocks, real estate, or collectibles such as coins, comic books, toys, collectible. Each transaction or a piece of transaction is indexed to a measure that is relevant/significant to the person/account involved in the transaction. Delta and beta adjusting of the index is possible so that derivative and more or less volatile transactions can be more accurately compared to each other.

In one implementation, information regarding a financial transaction is received. The significance may be determined with respect to a portion of the transaction compared to the whole or of the transaction compared to a property of the associated account. An example of the former, in the context of a consumer goods transaction, is the total value of good of interest in comparison to the total transaction. As an example of the latter, the total % the transaction represents an account's securities portfolio or the accounts available purchasing power. Adjustments of the significance may be made due to an amount of activity taking place in the portfolio compared to a baseline of that account's activities.

In the context of transactions involving securities, once the significance or confidence levels have been measured for the majority of securities, they can be aggregated (weighted average, etc.) into custom representations at an individual account or portfolio level. Investors can get an indication of how confident or how bullish or bearish other investors, such as the entire universe included in the significance index or only that of "active" investors or investors of a certain volume, certification, or net worth, are on the investor's own customized portfolio. One way to look at an investor's portfolio is to chart the confidence over time compared to the investor's individual portfolio performance. A simulation engine can be plugged into this view so investors could see how particular changes in their portfolio could change how confident active investors are on their portfolio. If the individual investor would like to take action they can manually trade or a rebalancing engine can automatically route the orders.

FIG. 10 is a graph over a period of time of a quantitative retail sentiment index of a sample investor portfolio compared to the portfolio value according to an illustrated embodiment. In this example portfolio, there are four stocks shown, AAPL, IBM, GE, BAC and a cash holding. The median of confidence levels of the stocks are shown graphed over time. In comparison, the value of the portfolio is shown graphed over the same time interval. In FIG. 10, positions that are cash only and the positions in individual stocks are used to calculate the sentiment index As shown, the cash holdings have low volatility and are calculated with 1.0 score. Also as shown, the median investor confidence reading is 1.2 indicating a bullish position. The sentiment index could be shown at a different frequency, e.g., weekly, daily, hourly, etc.

In one implementation, the significance score or confidence level of a particular stock may be displayed. In addition to showing an aggregation such as average or median of a portfolio of stocks, a distribution of confidence level of the individual stocks in the portfolio may be displayed in order to visualize the skew in confidence. Such skews in confidence may be visualized and displayed over time.

In the context of transactions involving consumer goods, the significance determination can be used to correlate with the consumer's priorities by calculating a priority score. The priority scores may be aggregated to form a consumer priority index. For example, a store may look at the purchase of a certain good relative to all purchases made at a certain point in time to gauge how much of a priority that certain good had at that point. If sales of the certain good have a much higher priority for people at a certain point in time, the store can use the information in various ways. The store may want to shuffle end caps or alter their displays in other ways to increase sales. The store may be able to organize inventory for optimization. The store may be able to alter upselling strategies.

In another embodiment in the context of securities transactions, the system can be used to look at market activity each day to give insight into how significant each symbol traded is based on how confident investors were at the time of each trade. This provides a different perspective than looking at volume or dollars traded. The significance of dollar amount traded are different depending on investor portfolios (e.g. a $1 k gain or loss in a $10 k portfolio vs. a $10M portfolio). Thus, significance can be calculated by determining the amount the transaction compares to 1) the entire account value, 2) the total value of transactions over a certain time period (e.g., last 7 days), 3) the total cash purchasing power (rather than the value of the account, which may reflect decisions made long ago), and 4) the purchasing power of the account including margin. Adjustments of the significance may be made through beta and delta adjusting, incremental expectations due to baselining significance of an individual client, and leveraging from options. The significance may also be adjusted up or down based on factors associated with the account and/or the good/security received and/or the financial instrument used (cash, margin, etc). For example, a consideration factor may be applied based upon the type of the first financial instrument. The significance may be increased where a financial transaction utilizes credit or margin purchasing power, as an indication of the willingness of the account user to leverage themselves to complete the transaction.

In one embodiment, the financial instrument transaction is analyzed to determine if it is a hedging event. For example, the financial instrument transaction may be compared to recent transactions to determine if there is an offsetting transaction or a related transaction such as a derivative purchased. A hedging factor may be applied to reduce the significance score of the associated asset. This may also be adjusted for frequency of behaviors such as the frequency of sellers being risk on versus sellers that are risk off. Frequency of behaviors could also be used to weight the significance score. There may also be beta or delta adjustment to render the significance score relevant regardless of hedging.

In another embodiment, the disclosure describes a system or method to calculate a consumer priority index for any financial instrument transaction, including securities transactions or purchased retail or wholesale consumer goods. The system or method calculates a significance score associated with a particular asset received by the account such as a security or consumer good. The significance scores for a plurality of accounts are aggregated to determine a significance index for the given financial instrument transaction indexed to a relevant measure. Relevant measures may be temporal, such as time of day, day of the week, day of the month, month of the year. Relevant measures may be security type, security name, aisle number or physical store location, expiration date of inventory, color, style, price, or any other relevant measure that can be tied to the consumer goods. The significance index may be calculated as a priority index to determine which of a plurality of assets acquired in a financial instrument transactions was the most important to the consumer based upon, for example, the relative value of the acquired items to the total financial instrument transaction value.

In addition, the system can indicate the scale of disagreement between buyers of the stock and sellers. For example, a stock's value may go down due to a larger volume of sells than buys, but the aggregate significance may indicate that the buyers' transactions have more significance to them than the sellers. A possible scenario would be where a large institutional investor sells on a light volume day that otherwise is primarily buys.

In another embodiment, the system can be used to look at market activity for an initial public offering (IPO) and compare the confidence of clients in their buys of a certain IPO relative to other IPOs.

In another embodiment, the system and methods determine a baseline significance for a class or category of items, such as S&P 500® stocks or goods sold at Target®. This baseline can be indexed and compared to the significance index for a given individual item within the class or category, such as for an individual stock or good sold.

In another embodiment, the system and methods store historical significance data to provide a timeline to the index to provide significance changes over time.

In another embodiment, the disclosure describes a system or method to modify a layout for consumer interaction: for example, by calculating a consumer priority index for interactions with a website. The system or method uses a historical record of significance scores associated with an account to modify the content and/or layout of a website. As a further example, a layout for a consumer establishment such as a store may be modified based on the significance index associated with its customers. The significance index may indicate that alcohol is a priority amongst their purchases on Friday evenings; thus the store changes its layout to more prominently display alcohol during the time periods associated with a high significance metric.

Each interaction with the website is indexed to a measure that is relevant to the user. The more significant the interaction with the website, the more relevant the factor may be for optimization or streamlining of the user/website interactions. For example, a web site that allows for the trading of securities could optimize and streamline the trading path for each client based on the point in time where the client is making their most significant trades. In addition, the stored significance scores related to website interactions could be used to detect anomalies in behavior. For example, a web site that allows for the trading of securities could detect when clients are making abnormally large or small trades, purchases, or transactions relative to their account size, previous behavior as related to the stored significance scores. This may also aid in fraud detection. Continuing the example of a web site that allows for the trading of securities, information can be tracked across portfolios or across the total client base to understand when active investors/clients are making small or large portfolio adjustments. Being able to index significant moves in portfolios to certain measures, such as time of day or day of the week, may be able to allow investors to potentially deploy trading strategies.

Figure 9:
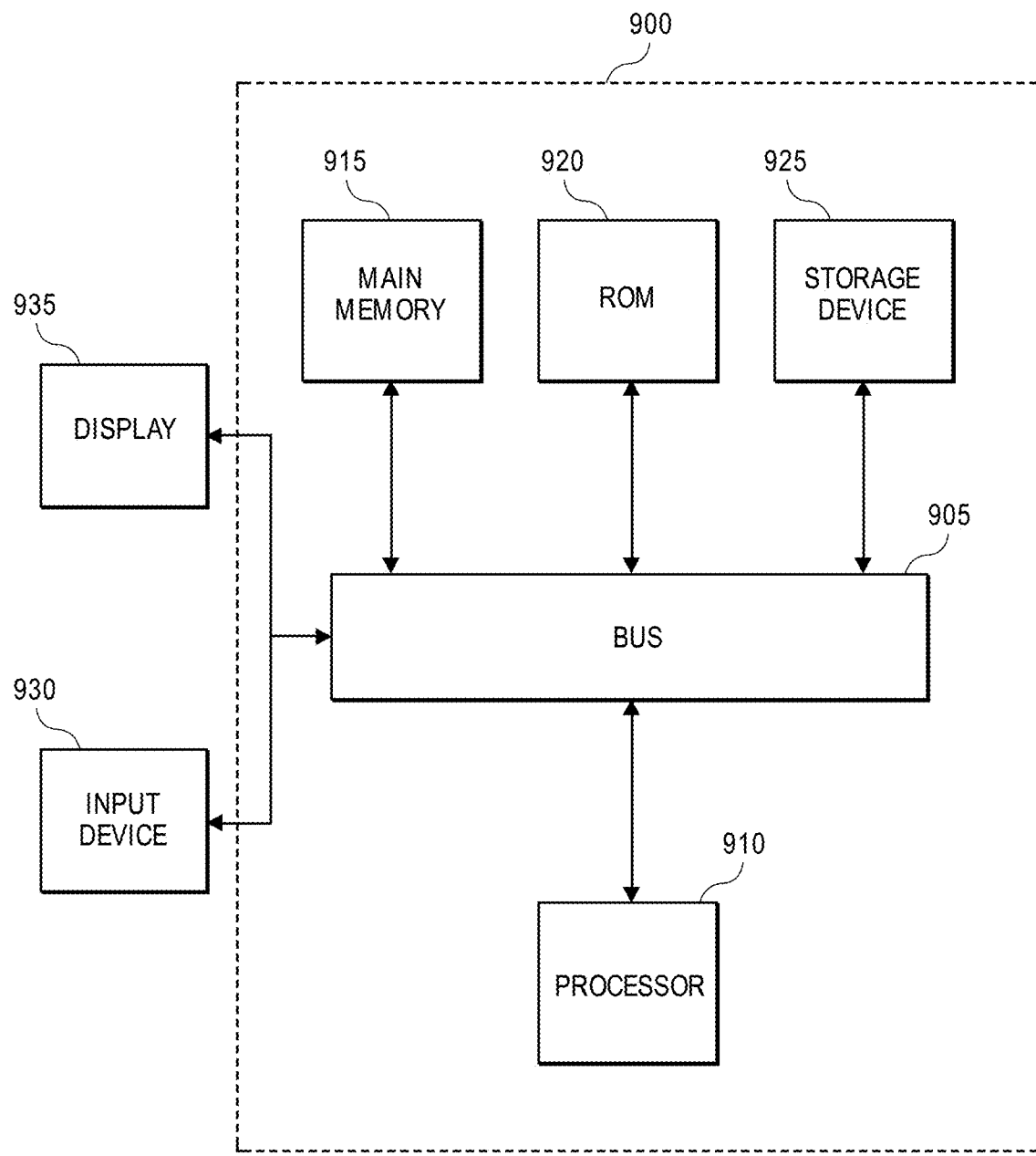
FIG. 9 is a block diagram of a computing device.

FIG. 9 is a block diagram of a computer system in accordance with an illustrative implementation. The computing system 900 includes a bus 905 or other communication component for communicating information and a processor 910 or processing circuit coupled to the bus 905 for processing information. The computing system 900 can also include one or more processors 910 or processing circuits coupled to the bus for processing information. The computing system 900 also includes main memory 915, such as a random access memory (RAM) or other dynamic storage device, coupled to the bus 905 for storing information, and instructions to be executed by the processor 910. Main memory 915 can also be used for storing position information, temporary variables, or other intermediate information during execution of instructions by the processor 910. The computing system 900 may further include a read only memory (ROM) 910 or other static storage device coupled to the bus 905 for storing static information and instructions for the processor 910. A storage device 925, such as a solid state device, magnetic disk or optical disk, is coupled to the bus 905 for persistently storing information and instructions.

The computing system 900 may be coupled via the bus 905 to a display 935, such as a liquid crystal display, or active matrix display, for displaying information to a user. An input device 930, such as a keyboard including alphanumeric and other keys, may be coupled to the bus 905 for communicating information and command selections to the processor 910. In another implementation, the input device 930 has a touch screen display 935. The input device 930 can include a cursor control, such as a mouse, a trackball, or cursor direction keys, for communicating direction information and command selections to the processor 910 and for controlling cursor movement on the display 935.

According to various implementations, the processes described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915. In alternative implementations, hard-wired circuitry may be used in place of or in combination with software instructions to effect illustrative implementations. Thus, implementations are not limited to any specific combination of hardware circuitry and software.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Thus, particular implementations of the invention have been described.

What is claimed is:

1. A computing system comprising:
   memory storing computer readable instructions stored thereon, and an enterprise data warehouse, the enterprise data warehouse including a plurality of objects, and the enterprise data warehouse storing a mapping of the plurality of objects to a plurality of users, each of the plurality of objects including a set of time-series data, each data point of the set of time-series data including a floating-point value, a date, and an identifier of one of the plurality of users; and
   processing circuitry configured to execute the computer readable instructions to cause the computing system to,
   receive an inquiry regarding a first user of the plurality of users and a first period of time,
   identify a first set of objects of the plurality of objects that correspond to the first user based on the mapping from the enterprise data warehouse, and
   generate a user interface for display to the first user, the user interface including a representation of a significance index for the first user in response to the received inquiry, the generating the user interface including, generating the significance index for the first user by calculating a weighted average of significance scores for the first set of objects, wherein a weight for each object of the first set of objects is determined based on an amount of the object associated with the first user in proportion to a total amount of the first set of objects, and wherein the processing circuitry is further caused to generate the significance index by, determining a significance score for a first object of the plurality of objects by, identifying a first set of users associated with the first object based on the mapping from the enterprise data warehouse, for each user of the first set of users, calculating an individual increase metric based on a relative proportion of (i) a value of an increase of the first object by the user to (ii) total purchasing power of the user, calculating an overall increase metric based on a median of the individual increase metrics for the first set of users, for each user of the first set of users, calculating an individual decrease metric based on a relative proportion of (i) a value of a decrease of the first object by the user to (ii) total purchasing power of the user, calculating an overall decrease metric based on a median of the individual decrease metrics for the first set of users, and determining the significance score based on a ratio of the overall increase metric and the overall decrease metric.

2. The computing system of claim 1, wherein the processing circuitry further causes the computing system to:

receive a user input indicating a simulated change in holdings of the first user, the change indicating a second set of objects selected from the plurality of objects;

generate a simulated significance index by calculating a weighted average of significance scores for the second set of objects; and generate an updated user interface for display to the first user that includes the simulated significance index.

3. The computing system of claim 2, wherein the processing circuitry further causes the computing system to:

automatically rebalance the holdings of the first user based on the simulated significance index.

4. The computing system of claim 1 wherein each object of the plurality of objects is associated with the first user.

5. The computing system of claim 1 wherein the processing circuitry further causes the computing system:

index the significance index against a measure that is selected from a group consisting of time of day, day of week, and month.

6. The computing system of claim 5 wherein:

at least one of the plurality of objects is a stock; and
each user of the plurality of users corresponds to a respective portfolio.

7. The computing system of claim 6 wherein the processing circuitry further causes the computing system:

index the significance index against the measure in order to show an active investor portfolio confidence trend.

8. The computing system of claim 1 wherein each object of the plurality of objects is selected from a group consisting of stocks, stock indexes, custom lists of stocks, real estate, and collectibles.

9. The computing system of claim 1 wherein the processing circuitry further causes the computing system to:

apply a consideration factor to the significance score of the first object of the plurality of objects.

10. The computing system of claim 9 wherein the processing circuitry further causes the computing system to:

in response to the consideration factor being greater than one and the first object including funds provided on margin or credit, increase the significance score of the first object.

11. The computing system of claim 9 wherein the processing circuitry further causes the computing system to:

in response to the first object involving a hedging transaction, reduce the significance score for the first object.

12. The computing system of claim 1 wherein the plurality of users excludes the first user.

13. The computing system of claim 1, wherein the processing circuitry further causes the computing system to:

determine securities currently being traded by other users included in the first set of users; and update the user interface to further display the determined securities based on the significance indices of the respective other users.

14. The computing system of claim 13, wherein the processing circuitry further causes the computing system to update the user interface to display securities being bought by the other users with a positive significance index as recommendation information to the first user.

15. The computing system of claim 13, wherein the processing circuitry further causes the computing system to update the user interface to display securities being sold by the other users with a negative significance index as recommendation information to the first user.

16. The computing system of claim 13, wherein the processing circuitry further causes the computing system to:

identify at least one second user from the other users by comparing an amount of change in the significance indices of each of the respective other users over a desired time period with a desired significance index threshold; and update the user interface to further display securities traded by the identified at least one second user during the desired time period as recommendation information to the first user.

17. A computing method comprising:

receiving, using processing circuitry, an inquiry regarding a first user of a plurality of users and a first period of time;

identifying, using the processing circuitry, a first set of objects of a plurality of objects that correspond to the first user based on a mapping from an enterprise data warehouse, wherein the enterprise data warehouse stores:

for each of the plurality of objects:

a set of time-series data, wherein each data point of the set of time-series data includes a floating-point value, a date, and an identifier of one of the plurality of users and the mapping of the plurality of objects to the plurality of users;

generating, using the processing circuitry, a user interface for display to the first user, the user interface including a representation of a significance index in response to the received inquiry, the generating the user interface including, generating the significance index for the first user by calculating a weighted average of significance scores for the first set of objects, wherein a weight for each object of the first set of objects is determined based on an amount of the object associated with the first user in proportion to a total amount of the first set of objects, the generating the significance index including, determining a significance score for a first object of the plurality of objects by, identifying a first set of users associated with the first object based on the mapping from the enterprise data warehouse, for each user of the first set of users, calculating an individual increase metric based on a relative proportion of (i) a value of an increase of the first object by the user to (ii) a total purchasing power of the user, calculating an overall increase metric based on a median of the individual increase metrics for the first set of users, for each user of the first set of users, calculating an individual decrease metric based on a relative proportion of (i) a value of a decrease of the first object by the user to (ii) the total purchasing power of the user, calculating an overall decrease metric based on a median of the individual decrease metrics for the first set of users, and determining the significance score based on a ratio of the overall increase metric and the overall decrease metric.

18. The computing method of claim 17 further comprising:

receiving, using the processing circuitry, a change in holdings of the first user, wherein the change indicates a second set of objects selected from the plurality of objects, generating, using the processing circuitry, a simulated significance index by calculating a weighted average of significance scores for the second set of objects; and generating, using the processing circuitry, an updated user interface for display to the first user that includes the simulated significance index.

19. The computing method of claim 17 wherein each object of the plurality of objects is associated with the first user.

20. The computing method of claim 17 further comprising:

indexing, using the processing circuitry, the significance index against a measure that is selected from a group consisting of time of day, day of week, and month.

21. The computing method of claim 20 wherein:

at least one of the plurality of objects is a stock, and each user of the plurality of users corresponds to a respective portfolio.

22. The computing method of claim 21 further comprising:

indexing, using the process circuitry, the significance index against the measure in order to show an active investor portfolio confidence trend.

23. The computing method of claim 17 wherein each object of the plurality of objects is selected from a group consisting of stocks, stock indexes, custom lists of stocks, real estate, and collectibles.

24. The computing method of claim 17 further comprising:

applying, using the processing circuitry, a consideration factor to the significance score of the first object of the plurality of objects.

25. The computing method of claim 24 further comprising:

increasing, using the process circuitry, the significance score of the first object in response to the consideration factor being greater than one and the first object including funds provided on margin or credit.

* * * * *